US012585257B2

(12) United States Patent
Weaver et al.

(10) Patent No.: US 12,585,257 B2
(45) Date of Patent: Mar. 24, 2026

(54) AUTOMATED DATA TRANSFER BETWEEN AUTOMATION SYSTEMS AND THE CLOUD

(71) Applicant: Rockwell Automation Technologies, Inc., Mayfield Heights, OH (US)

(72) Inventors: Matthew Weaver, Strongsville, OH (US); Nathaniel S. Sandler, Chagrin Falls, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 516 days.

(21) Appl. No.: 18/168,646

(22) Filed: Feb. 14, 2023

(65) Prior Publication Data

US 2024/0272625 A1     Aug. 15, 2024

(51) Int. Cl.
　　 *G05B 19/418* 　　(2006.01)
　　 *G06F 16/25* 　　(2019.01)

(52) U.S. Cl.
　　 CPC ....... *G05B 19/4185* (2013.01); *G06F 16/254* (2019.01)

(58) Field of Classification Search
　　 CPC .................... G06F 16/254; G05B 19/4185
　　 See application file for complete search history.

(56) References Cited

U.S. PATENT DOCUMENTS

| | | | | |
|---|---|---|---|---|
| 2009/0164486 | A1* | 6/2009 | Foeldesi | ............... G06F 16/254 |
| 2017/0025040 | A1* | 1/2017 | Maturana | ................. G06N 5/04 |
| 2018/0052451 | A1* | 2/2018 | Billi-Duran | ...... G05B 19/41835 |
| 2018/0357334 | A1* | 12/2018 | Chao | ............... G05B 19/41885 |
| 2019/0064787 | A1* | 2/2019 | Maturana | ........... G05B 23/0227 |
| 2022/0377132 | A1* | 11/2022 | Gupta | ................... H04W 84/18 |
| 2023/0144177 | A1* | 5/2023 | Khosravi | ................. F24F 11/64 |
| | | | | 700/278 |
| 2024/0134326 | A1* | 4/2024 | Li | ......................... H04L 63/123 |

\* cited by examiner

*Primary Examiner* — Vincent H Tran
(74) *Attorney, Agent, or Firm* — Amin, Turocy & Watson, LLP

(57) ABSTRACT

An industrial extract, transform, and load (ETL) system extracts and transfers data from proprietary industrial systems and devices to cloud-level systems or other higher level applications. The industrial ETL system uses application connectors that are designed to interface with various types commonly used or proprietary industrial systems and devices—including but not limited to industrial controllers, open platform communications (OPC) servers, databases, MQ telemetry transport (MQTT) brokers, motor drives, telemetry devices, etc.—and to extract data from those systems in a manner that reduces the impact on those systems' core functionalities relative to conventional ETL approaches. The system's application connectors use the same technology stack to communicate with multiple different devices and systems that are commonly found in industrial software architectures.

20 Claims, 13 Drawing Sheets

TO CLOUD

TRANSFORMED
DATA TO CLOUD

202

ETL SYSTEM

CLOUD INTERFACE
COMPONENT        212

704

TRANSFORMED
DATA

DATA
TRANSFORMATION
COMPONENT        210

604

APPLICATION
DATA

222

APPLICATION
INTERFACE
COMPONENT

204

APPLICATION CONNECTOR

302

AUTOMATED DATA TRANSFER BETWEEN AUTOMATION SYSTEMS AND THE CLOUD

TECHNICAL FIELD

The subject matter disclosed herein relates generally to industrial automation systems, and, for example, to migration of industrial data to cloud-based services and applications.

BACKGROUND ART

In recent years businesses have begun migrating their information technology (IT) applications and workloads to cloud platforms. Many industrial enterprises that own and operate industrial automation systems are attempting to do the same with their operational technology (OT) data and systems. Conventional data migration solutions, such as extract, transform, and load (ETL) systems, are not well suited to extraction and migration of data from industrial devices and systems.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising an application interface component configured to establish a communication channel to an industrial data source, wherein the industrial data source maintains a data table that stores current values of data items that are written to and read from by the industrial data source; a log query component configured to identify, based on an examination of an event log generated by and stored on the industrial data source, a subset of the data items whose values have been modified in excess of a defined threshold since a previous examination of the event log; and a data retrieval component configured to query, via the communication channel, the data table for values of the subset of the data items based on a result of the examination.

Also, one or more embodiments provide a method, comprising establishing, by a system comprising a processor, a connection to an industrial data source, wherein the industrial data source stores current values of respective data tags that are written to and read from by the industrial data source in a data table; identifying, by the system based on an examination of an event log generated by and stored on the industrial data source, a subset of the data tags having values that have changed in excess of a defined threshold since a previous examination of the event log; and in response to the identifying, querying, by the system via the connection, the data table for values of the subset of the data tags.

Also, according to one or more embodiments, a non-transitory computer-readable medium is provided having stored thereon instructions that, in response to execution, cause a system comprising a processor to perform operations, the operations comprising establishing a communication channel to an industrial data source, wherein the industrial data source maintains a data table that stores current values of data registers that are written to and read from by the industrial data source; examining, via the communication channel, an event log generated by and stored on the industrial data source; identifying, based the examining, a subset of the data registers whose values have changed in excess of a threshold since a previous examining of the event log; and in response to the identifying, querying, via the communication channel, the data table for values of the subset of the data registers.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
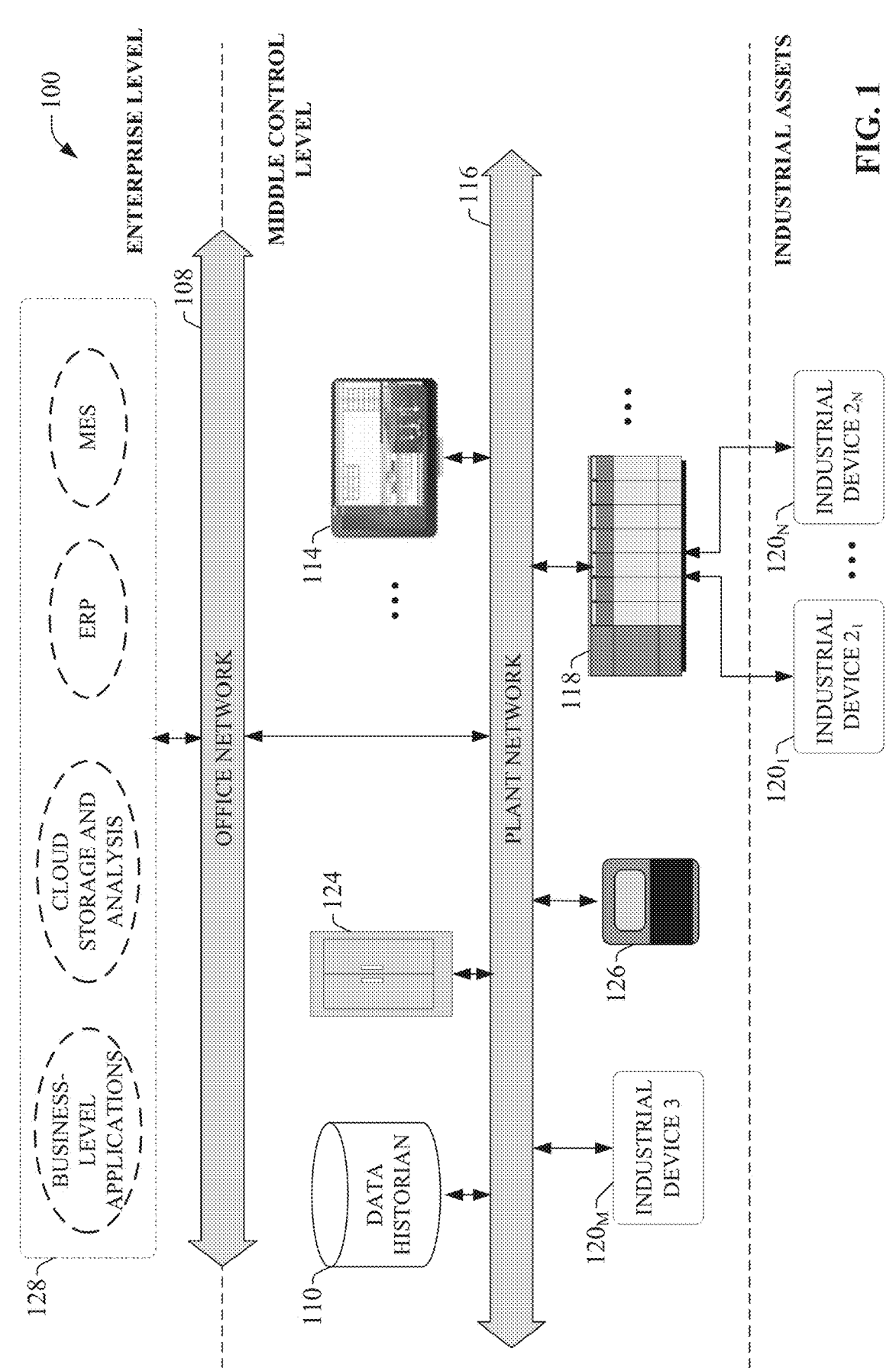
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with networked industrial devices 120$_M$ over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, motor control centers 124 that house motor control devices, motor drives such as variable frequency drives 126, vision systems, industrial analytic systems, edge devices, or other such systems.

Higher-level systems 128 may carry out functions that are less directly related to control of the industrial automation systems on the plant floor, and instead are directed to long term planning, high-level supervisory control, analytics, reporting, or other such high-level functions. These systems 128 may reside on the office network 108 at an external location relative to the plant facility, or on a cloud platform with access to the office and/or plant networks. Higher-level systems 128 may include, but are not limited to, cloud storage and analysis systems, big data analysis systems, manufacturing execution systems (MES), data lakes, reporting systems, enterprise resource planning (ERP) systems, or other such high level systems. In some scenarios, applications running at these higher levels of the enterprise may be configured to analyze control system operational data, and the results of this analysis may be fed back to an operator at the control system or directly to a controller 118 or device 120 in the control system.

Industrial enterprises use various systems to manage operations, collect data, and optimize their processes. If the data generated by the enterprise's various industrial devices and systems are transported to higher level storage, such as a cloud-based data lake or data warehouse, the data can be normalized, aggregated, and analyzed to discover insights into plant floor operations, particularly if combined with relevant data form other business systems not available to the plant floor. Other types of applications—such as visualization systems, reporting systems, work order management systems, etc.—could also beneficially leverage industrial data that has been migrated from plant floor devices and systems to the cloud. As industrial data estates continue to grow, the ability to integrate data from many different aspects of a distributed industrial environment becomes essential for making decisions that impact operations and production.

However, this integration of diverse industrial data is complicated and expensive. Conventional data migration solutions, such as extract, transform, and load (ETL) systems, are not well suited to extraction and migration of data from industrial devices and systems. For one, the proprietary protocols and data repositories used by industrial devices and software entities make it difficult for data migration systems to obtain and migrate data from these industrial systems to a central data repository. Moreover, data migration systems typically obtain data from source devices by periodically polling those devices for their current data values, which can inundate those devices and their associated software with data requests. These periodic data requests can hamper the data engines of those devices, negatively impacting other processing functions carried out by the devices. While this performance attenuation may be acceptable in traditional information technology (IT) contexts, operational technology (OT) systems may be less forgiving of the processing costs associated with high-frequency data polling given the crucial timing requirements of industrial process control.

To address these and other issues, one or more embodiments described herein provide an industrial ETL system capable of obtaining and transferring data from proprietary industrial systems and devices to cloud-level systems or other higher level applications. The ETL system uses application connectors that are designed to interface with various types commonly used or proprietary industrial systems and devices—including but not limited to industrial controllers, open platform communications (OPC) servers, databases, MQ telemetry transport (MQTT) brokers, motor drives, telemetry devices, etc.—and to extract data from those systems in a manner that reduces the impact on those systems' core functionalities relative to conventional ETL approaches. The system's application connectors use the same technology stack to communicate with multiple different devices and systems that are commonly found in industrial software architectures.

To reduce the processing impact on the industrial devices or systems, the industrial ETL system can retrieve data on an event-driven basis—e.g., in response to detected changes to data values, or in response to a determination that the data values satisfy another defined condition-rather than periodically polling the data sources for their current data values. Data collection events can be detected based on examination of event logs generated by the data source devices and systems, rather than polling the data tables of those devices. Some embodiments of the industrial ETL system can also support writeback from high-level systems to the industrial data sources.

Figure 2:
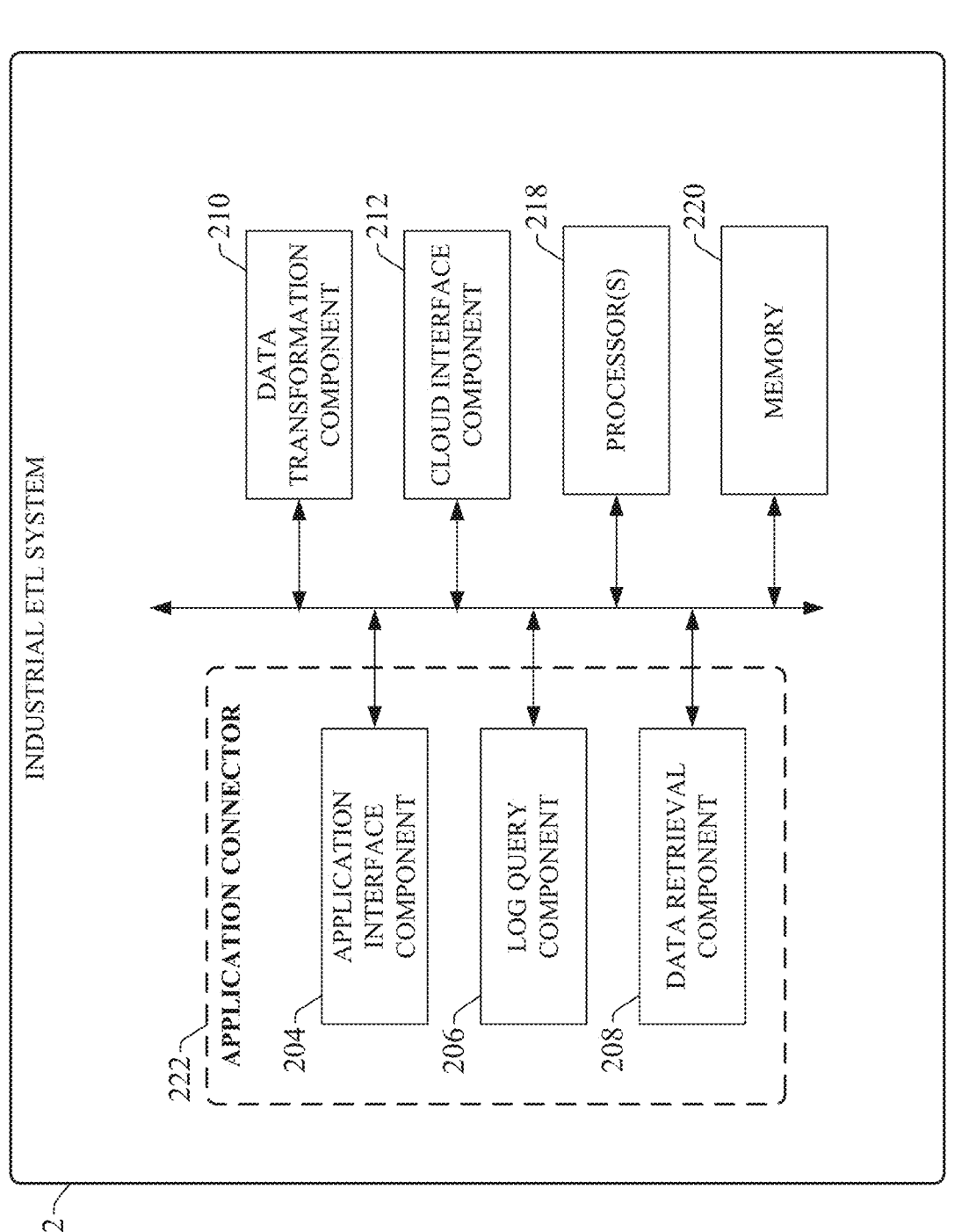
FIG. 2 is a block diagram of an example industrial extract, transform, and load (ETL) system capable of leveraging a combination of native ETL capabilities for real-time event streaming to and from a selected data repository or application, such as a cloud-based data lake or analytic application.

FIG. 2 is a block diagram of an example industrial ETL system capable of leveraging a combination of native ETL capabilities for real-time event streaming to and from a selected data repository or application, such as a cloud-based data lake or analytic application. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial ETL system 202 can include an application interface component 204, a log query component 206, a data retrieval component 208, a data transformation component 210, a cloud interface component 212, one or more processors 218, and memory 220. In various embodiments, one or more of the application interface component 204, log query component 206, data retrieval component 208, data transformation component 210, cloud interface component 212, the one or more processors 218, and memory 220 can be electrically and/or communicatively coupled to one another to perform one or more of the functions of the industrial ETL system 202. In some embodiments, components 204, 206, 208, 210, and 212 can comprise software instructions stored on memory 220 and executed by processor(s) 218. Industrial ETL system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Application interface component 204 can be configured to communicatively interface with an industrial device or application that serves as a source of data to be migrated to an external or cloud-based data repository. In some embodiments, the ETL system 202 can instantiate different application interface components 204 that use the same technology stack to talk to respective different types of industrial data sources. Log query component 206 can be configured to query, via communication channels established by the application interface component 204, event log files generated by the industrial devices and applications to determine whether a data collection trigger has been satisfied. The collection trigger may be, for example, a determination that one or more data values on the industrial device or application have been modified in excess of a defined threshold since a previous examination of the event log file. Data retrieval component 208 can be configured to collect a selected set of current data values from the industrial devices or applications in response to a determination by the log query component 206 that the collection trigger has been satisfied. Collectively, the log query component 206, data retrieval component 208, and an instance of the application interface component 204 can act a containerized application connector for connecting to, and extracting data from, a specific type of industrial device, application, or system.

Data transformation component 210 can be configured to apply a defined transformation on data obtained by the data retrieval component 208. This transformation can include, for example, adding contextual metadata to the data, filtering the data, applying pre-analytics to the data, or other such transformations. Cloud interface component 212 can be configured to communicatively interface with a destination entity—such as a cloud-based data repository, analytic system, reporting system, visualization system, or other such destinations—and send the transformed data to the destination.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
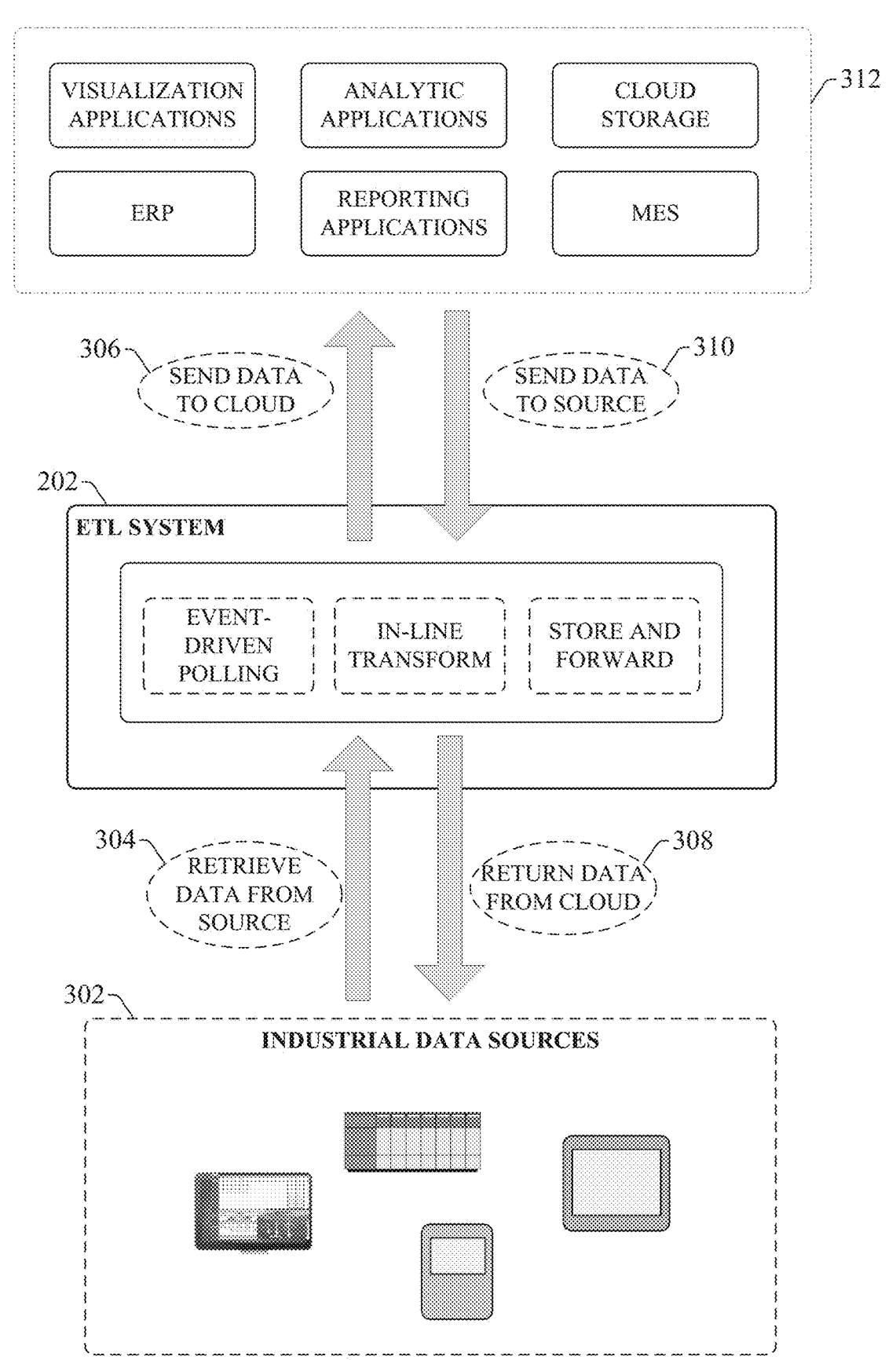
FIG. 3 is a high-level diagram illustrating an example architecture in which an industrial ETL system is used for data migration and writeback.

FIG. 3 is a high-level diagram illustrating an example architecture in which the industrial ETL system 202 is used for data migration and writeback. In this example, ETL system 202 is used to extract and migrate data from a variety of industrial data sources 302 deployed within a plant facility. Industrial data sources 302 can include industrial devices used to monitor and control an industrial automation system or process, such as industrial controllers, HMI terminals, motor drives, telemetry devices and sensors, or other such devices. Data sources 302 can also include industrial hardware and/or software applications that leverage data generated by the industrial devices to perform related storage, processing, or communication functions, such as data historians, OPC servers, databases, MQTT brokers, batch control systems, industrial alarm systems, communication applications that maintain communication links between industrial software and devices, edge devices, or other such systems.

Industrial ETL system 202 can be deployed as either an on-premise system that resides within the same plant facility as the industrial data sources 302, or can be implemented on a cloud platform as a set of cloud-based services. In either architecture, the ETL system 202 uses containerized application connectors 222 (see FIG. 2) to connect to respective different data sources 302 of various types, and retrieve data 304 from those sources 302. Substantially any type of industrial data 304 can be retrieved and migrated by the ETL system 202, including but not limited to data generated by an industrial controller and retrieved from the controller's data table or data tags, telemetry data obtained from a meter, historical production data obtained from a data historian or a batch control system, analytic result data obtained from a plant-level analysis system that performs an analysis on selected subsets of production data (e.g., predictive maintenance systems, work order management systems, etc.), or other such data.

Periodic polling of industrial data sources 302 for their current data values can add to the processing load of those devices and applications, potentially slowing or otherwise negatively impacting the primary functions carried out by those data sources 302. In the case of industrial control devices that perform real-time, high-speed monitoring and control of an industrial process, this additional processing load may result in control errors or slowed performance. To minimize the impact on the primary functions of the industrial data sources 302, the ETL system 202 can poll for and retrieve data 304 from the data sources 302 on an event-driven basis rather than polling the data sources for data 304 at periodic intervals. For example, ETL system 202 may be configured to extract data values from a data source 302 only when those values change (an on-change event), thereby eliminating the collection of redundant unchanged data values and achieving a commensurate reduction of data traffic from the data sources 302 to the ETL system 202. To further reduce the processing costs caused by excessive querying of a data source's data tables, the ETL system 202 can identify these on-change data events by examining an event log generated the data source 302 rather than by querying the data tables themselves.

Upon retrieval of data 304 from a data source 302 (triggered by detection of a change to the data's values or another event trigger), ETL system 202 can perform in-line transformation on the retrieved data 304 prior to migrating the collected data to the desired destination. This can include, for example, filtering the data 304 by removing data items or values that do not satisfy a defined criterion (e.g., values that exceed a defined threshold, values that deviate from a mean value in excess of a defined threshold, etc.), adding contextual metadata based on a current condition (e.g., a current operating state of an automation system, a current work shift, a current product or material being produced, etc.), or other such transformations. The system 202 then sends the resulting filtered or transformed data 306 to the designated destination application 312. Example destination applications 312 to which the transformed data 306 can be sent include, but are not limited to, visualization applications that render current or historical operational or status information for an industrial process, analytic applications that apply analytics to the data 306 (e.g., predictive maintenance applications, optimization applications, energy management applications, etc.), MES systems, ERP systems, data repositories such as data lakes, reporting applications, or other such destinations. Destination applications 312 may execute on a cloud platform (e.g., a cloud-based data lake or analytic application), may execute on on-premise servers within the plant facility, or may execute on off-premise servers outside of the plant facility.

Some embodiments of the ETL system 202 can also support writeback of data from the destination application 312 to the data source 302. Writeback of data from a higher-level application to the data source application or device may be appropriate if the destination application 312 is designed to provide feedback to the data source application based on results of high-level analytics (e.g., a supervisory control application). The ETL system's writeback mechanism allows the destination application 312 to send, to the ETL system 202, data 310 directed to the data source 302. The ETL system 202 can perform in-line transformation processing on the data 310 if necessary, and send the resulting transformed data 308 to the data source 302. In some embodiments, the ETL system 202 can execute the data migration and writeback actions using parallel processing.

Figure 4:
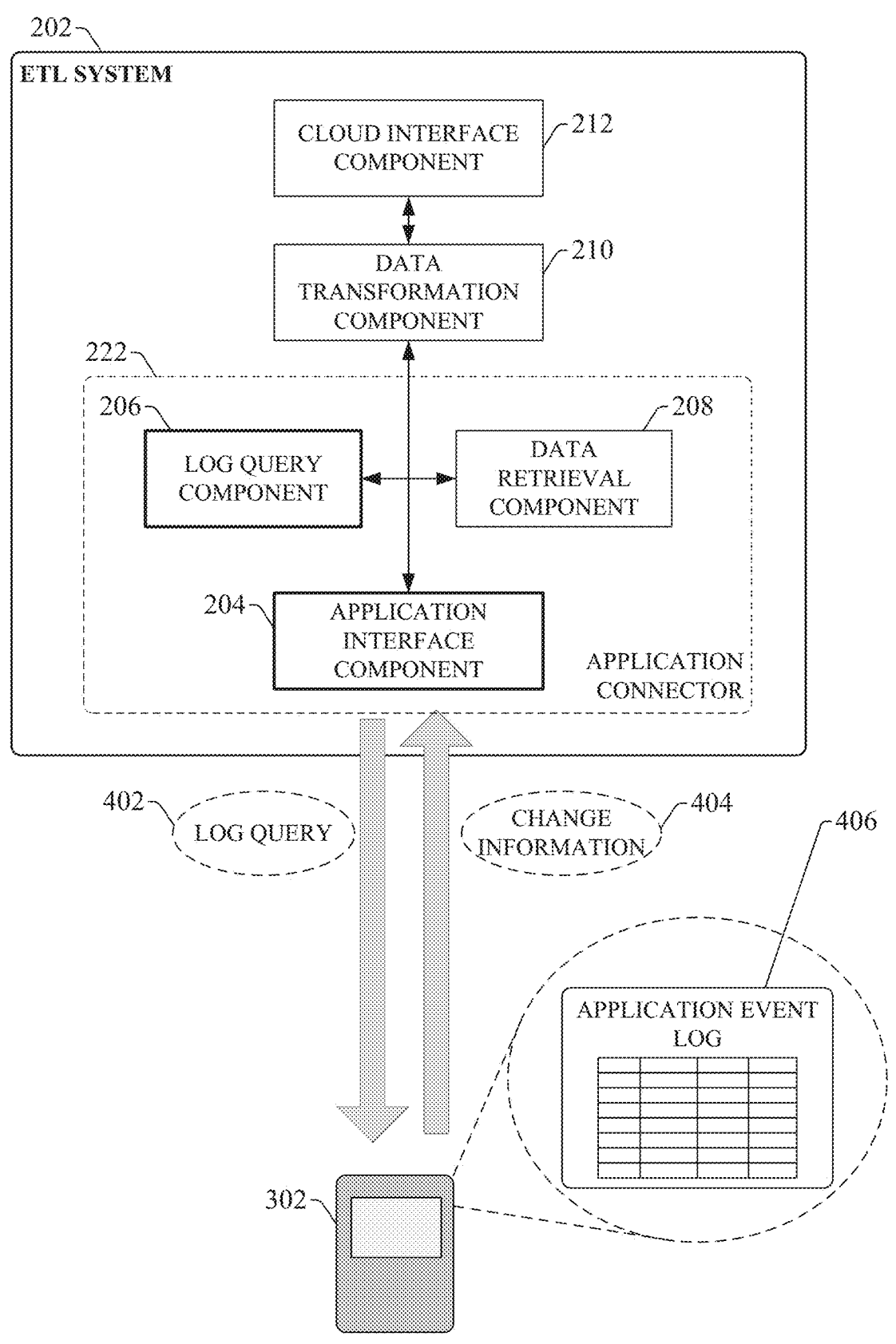
FIG. 4 is a diagram illustrating querying of an industrial device or application's event log by an industrial ETL system.

The general ETL process described above can more efficiently extract and migrate data from industrial applications and devices relative to conventional ETL approaches, and with less impact on the functionality of those data sources, by using a combination of event-driven data collection enabled by event log queries together with containerized application connectors 222 that use the same technology stack to communicate with multiple different industrial protocols commonly used within an industrial context. The general data extraction, transformation, and migration process carried out by the industrial ETL system 202 is now described in more detail. FIG. 4 is a diagram illustrating querying of an industrial device's or application's event log by the industrial ETL system 202. In this example, the ETL system 202 communicates with, and extracts data from, an industrial data source 302, which may be an industrial device that is part of an industrial automation system (e.g., an industrial controller, a motor drive such as a variable frequency drive, a telemetry device, etc.) or an industrial application that either participates in monitoring and control of an automation system or analyzes a portion of the operational or status data generated by the automation system for some purpose (e.g., a visualization system, a predictive maintenance system, an optimization system, a vision system, a reporting system, etc.).

To communicate with the industrial data source 302, the ETL system 202 can instantiate an application connector 222 designed to communicate with the type of industrial device or application represented by the data source 302. The application connector 222 comprises an application interface component 204 designed to communicatively interface with the data source 302 over any intermediate public or private networks and associated infrastructure devices (e.g., a cloud platform, the internet, an office and/or plant network within the industrial facility, a gateway or edge device, etc.). The application interface component 204 is designed to understand and support the communication protocols and data schemas used by the data source 302 so that communication can be established and data of interest can be identified and extracted. In general, the ETL system 202 can instantiate multiple application connectors 222 designed to communicate with respective multiple types of industrial data sources 302. Regardless of the different data source protocols supported by the application connectors 222, the connectors 222 use the same technology stack to communicate with the diverse data sources 302.

Typically, a data source 302 such as an industrial application or device maintains its current data values in a data table or other designated portion of its memory. The data source 302 writes values to, and reads values from, the data items, tags, or registers stored in the data table. Queries directed to the data table, either from the data source 302 itself or from an external entity, are processed by a data engine or another software component that regulates access to the data. These data engines interpret incoming requests for specified data values stored on the data source, retrieve the requested data values from the data table, and return the retrieved data to the entity that originated the query.

It is recognized that periodic queries to the data source's data table can tax the data engine and result in a commensurate increase in processing load on the data source 302, particularly in the case of high-frequency polling and data retrieval carried out by many ETL systems. In turn, this can slow execution of the industrial device's or application's primary functions, resulting in impaired performance or control errors. To address this issue, rather than performing periodic querying of, and data extraction from, the data table to yield a substantially continuous real-time stream of data from the data source 302 to a target destination, the industrial ETL system 202 can be configured to only retrieve data values from the data source's data table in response to determining that the data values satisfy a defined collection event or trigger. For example, a user may define the collection event to be an on-change event, such that the ETL system 202 only retrieves a value of a data item (e.g., a data tag or register) in response to determining that the value has changed relative to the most recently retrieved value of the data item, or has changed relative to the most recently retrieved value in excess of a defined tolerance threshold. The on-change event indicates to the ETL system 202 that new data values are available for retrieval and migration. While the examples described herein assume that the data collection event is an on-change event, other collection events are also within the scope of one or more embodiments (e.g., a data value drifting outside a defined range, an occurrence of a specific error detected by the data source 302, etc.).

By performing data retrieval actions only when values of data items of interest have changed (or have changed in excess of a defined tolerance), the ETL system 202 reduces the number of data retrieval queries directed to the data source's data engine relative to continuous periodic polling and retrieval. To further reduce the number of queries directed to the data engine, the ETL system 202 can be configured to determine when an on-change event has been satisfied—and thus when a query to the data table should be performed-without querying the data table itself. To this end, rather than examining the data table itself to determine when data values of interest have changed, the ETL system can monitor an event log 406 generated by the software executing on the data source 302.

Figure 5:
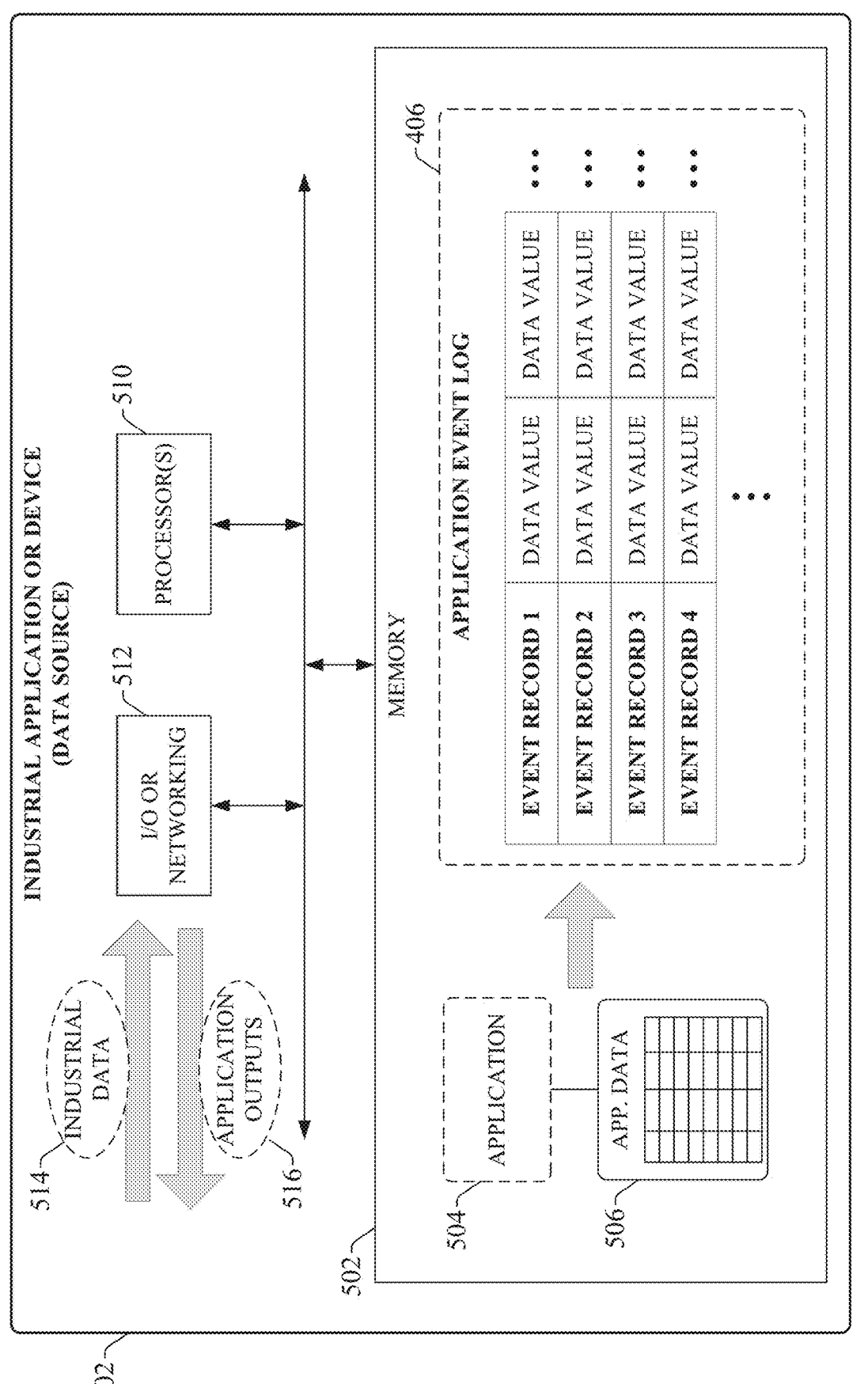
FIG. 5 is a diagram of an example data source illustrating creation of an event log and its relationship to the data source's data table.

FIG. 5 is a diagram of an example data source 302 illustrating creation of an event log 508 and its relationship to the data source's data table 506. In this example, data source 302 is an industrial device or another hardware platform that executes an industrial application 504 stored on the data source's memory 502. The application 504 is executed using one or more processors 510 on the data source 302. The application 504 may be, for example, an industrial control application (e.g., control programming executed by an industrial controller), an industrial analytics application (e.g., an optimization application designed to monitor, analyze, and optimize an industrial control process; a predictive maintenance application designed to analyze operational and status data generated by an automation system and predict operational failures or inefficiencies; an application designed to calculate performance metrics based on real-time and historical operational and status data, etc.), an industrial asset management application, an industrial alarm or notification system; a data historian application; or another type of industrial software.

For applications 504 that process or analyze operational or status data generated by industrial automation systems, the data source 302 may also include an integrated I/O or networking component 512 that receives industrial data 514 from external sources for processing by the application 504. Industrial data 514 may include, for example, digital and/or analog I/O signals received from industrial input devices, such as telemetry devices or sensors, that are part of the automation system being analyzed. Industrial data 514 may also comprise data received from other applications or systems via a network connection (e.g., weather forecast information, work schedule information, purchase order information, etc.), or user input data submitted to the application via interaction with an appropriate user interface. Industrial data 514 serves as input data to the application 504, which processes the industrial data 514 to generate application outputs 516 in accordance with the application's 504 primary functions. In the case of an industrial device that performs monitoring and control of an automation system, the outputs 516 may comprise digital or analog output signals directed to industrial output devices (e.g., motor drives, pneumatic actuators, solenoid valves, industrial robot axes, temperature control systems, operator signaling devices, etc.) that are part of the automation system. In the case of an industrial analytic system, the outputs 516 may comprise calculated data values, such as performance metrics, or information specifying an analytic result, such as a predicted maintenance event or recommended control modification.

As part of its execution, application 504 can generate and maintain an event log 406 that records software and hardware events relating to execution of the application 504. The event log 406 is a file comprising a chronological sequence of time-stamped event records describing actions taken by the application 504 as part of its execution, software or hardware occurrences detected by the application 504, errors raised by the application 504, or other such events. The application 504 can generate and store the event log 406 in a memory location that is separate from the application's data table 506, and can add new event records to the event log 406 as new events occur. The types of events recorded in the event log 406 can depend on the type of industrial application 504 being executed, and can include, for example, operating system events, data write and data read events performed by the application 504, queries received and processed by the application 504, execution errors, user data entries, or other such events. Each event record in the event log 406 can comprise a set of data items describing its corresponding event, including but not limited to a time-stamp indicating the time at which the event occurred, an event code, a description of the event, a source or destination of the event, values of data items or data tags that were modified as a result of the event, or other such information.

Since most data sources 302 create an event log 406 as part of their innate processing tasks, this log 406 can be examined to determine whether any data values within the data table 506 have changed without directly querying the data table 506 or invoking its associated data engine. Returning now to FIG. 4, the application connector 222 for the data source 302 can include a log query component 206 that examines the content of the event log 406 to determine whether any event records that were added to the log 406 subsequent to a most recent previous examination of the log 406 indicate that one or more data items of the data table 506 were modified by the application 504.

In an example approach, the log query component 206 can send periodic log queries 402 to the data source 302. Alternatively, log queries 402 can be sent in response to detecting that the event log 406 has been updated by the application 504. Each log query 402 is configured to initiate an examination of the most recently added event records contained in the event log 406; specifically, the event records that were added since a most recent previous log query 402 was sent. If the application 504 had changed a value of one or more data items of the data table 506 since the previous examination of the event log 406 (e.g., by initiating a data write event), the application 504 will have added event records to the event log 406 to record the occurrences of the data write events. These event records also identify the data items or data tags whose values were modified, and in some cases may also record the new values of those data items.

Figure 6:
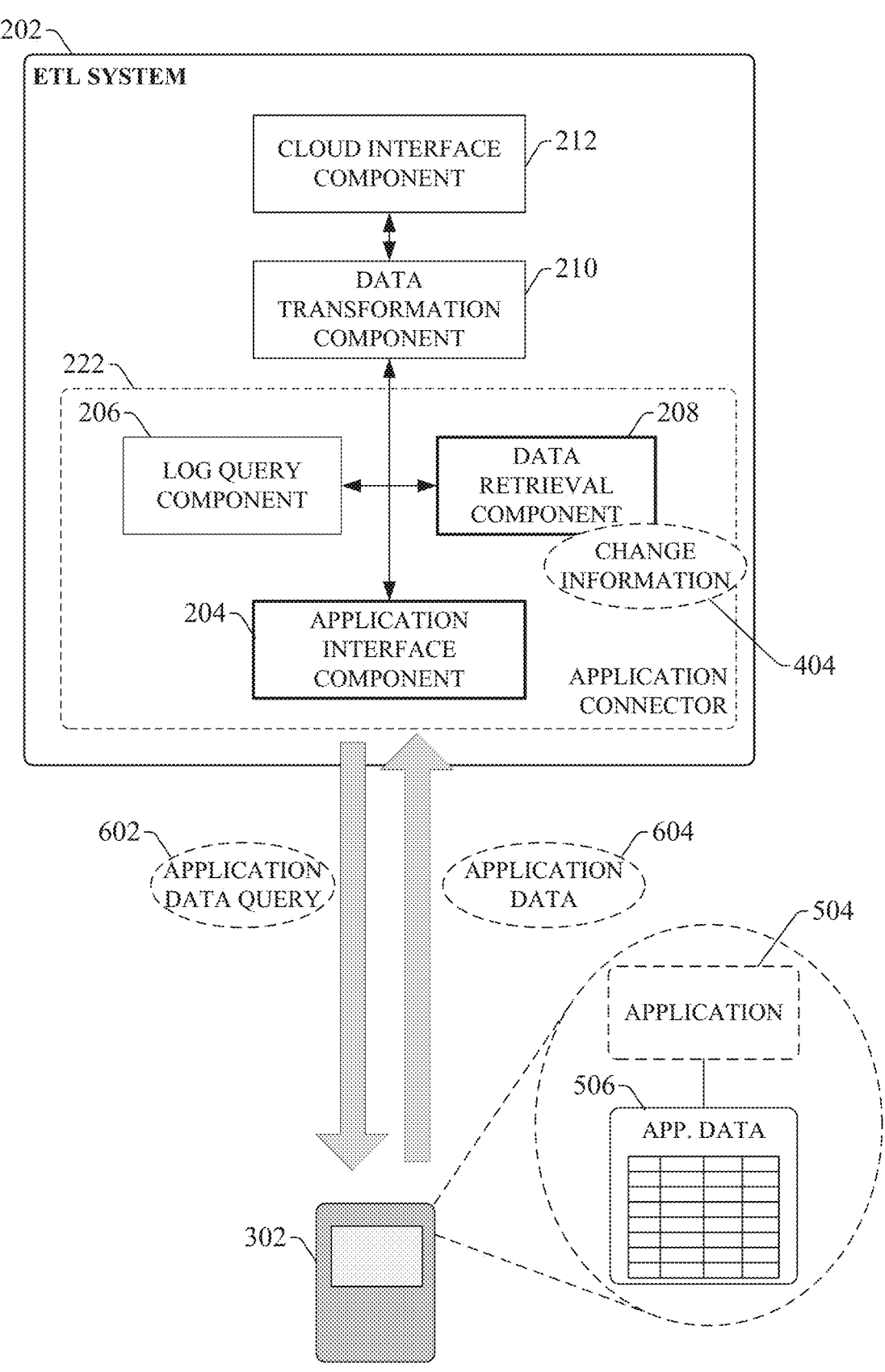
FIG. 6 is a diagram illustrating retrieval of application data from the data source based on the change information that was obtained by polling the event log.

Based on a result of this log query 402, the log query component 206 obtains change information 404 from the data source 302 identifying which data items or data tags of the data source's data table 506 have been modified since the previous examination of the event log 406. Based on this change information 404, the ETL system's data retrieval component 208 can then poll the data source 302 to obtain the current values of the data items or tags identified by the change information 404. FIG. 6 is a diagram illustrating retrieval of application data 604 from the data source 302 based on the change information 404 that was obtained by polling the event log 406. Data retrieval component 208 can identify the data items, reported by the change information 404, whose values have been modified since the most recent previous query of the even log 406, submit an application data query 602 to the data source 302 requesting the current values of those data items, and retrieve those values as application data 604.

By submitting queries 602 sent to the data source's data engine only when an examination of the application's event log 406 indicates that data items of interest have changed, the industrial ETL system 202 lowers the processing and bandwidth cost associated with data extraction relative to polling the data source 302 periodically for the current values of its data items. Moreover, the queries 602 submitted by the ETL system 202 only request the current values of data items that have changed since the previous examination of the event log 406, rather than polling for the current values of all data items of interest, thereby further reducing the processing and communication load associated with data migration.

In addition, the application connector 222 instantiated by the ETL system 202 is specific to the type of industrial data source 302 from which data is extracted, and encodes domain knowledge of the data source's communication protocols and data schemas, which may be proprietary to the industrial data source 302 or to the industrial space in general. This allows the connector 222 to interface and communicate with the data source 302, to locate and access the data source's event log 406 and data table 506, to locate data items within the data table 506 that are to be extracted, and to correctly translate or interpret those data items as needed. Example industrial data source types for which application connectors 222 can be created can include, for example, vendor-specific industrial controllers, motor drives, OPC servers, industrial data historians, MQTTT brokers, industrial telemetry devices (e.g., flow meters, temperature meters, pressure meters, etc.), sensors, quality check systems such as vision systems, or other such data sources 302.

Figure 7:
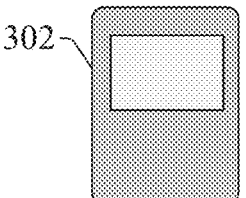
FIG. 7 is a diagram illustrating transformation of extracted data by an industrial ETL system.

Once the application data 604 has been retrieved, the ETL system's data transformation component 210 can apply any defined transformation on the data 604 prior to migration to the higher level or external systems. FIG. 7 is a diagram illustrating transformation of the extracted data 604 by the ETL system 202. For example, the data transformation component 210 can filter the extracted application data 604 by removing or cropping data values that are outside a range defined for the originating data item or tag, or that exceed a median value for the data item. Removing these outlier or redundant values can reduce the processing load on the destination systems that will be receiving and processing extracted data. Other example transformations that can be performed by the data transformation component 210 can include, but are not limited to, addition of contextual metadata to the data values, preprocessing on the data 604 and bundling the results of the preprocessing with the data 604, or other such transformations.

Contextual metadata added to the extracted data 604 by the data transformation component 210 can be designed to assist the destination system or repository in understanding or analyzing the data 604, or to converge more quickly to a meaningful analytic insight when analyzing the data 604.

Example contextual metadata that can be added by the data transformation component 210 can include, but is not limited to, an identity of an industrial machine to which the data 604 relates, a product or material being produced by the machine or an operating mode of the machine at the time the data 604 was retrieved, a work shift during which the data 604 was collected, an identify of an industrial facility from which the data 604 originated, or other such contextual information. The ETL system 202 can support configuration tools that allow users to define the transformations to be applied to the extracted data 604 by the data transformation component 210, including the types of contextualization data to be added.

After applying any defined transformations on the extracted application data 604, the data transformation component 210 provides the resulting transformed data 704 to the cloud interface component 212, which migrates the transformed data 704 to the destination system or repository. Although the examples depicted herein assume that the transformed data 704 is migrated to a cloud-based system or repository, the ETL system 202 can be configured to migrate the transformed data 704 to substantially any type of off-premise or on-premise data repository or system, including any of the destination applications 312 described above (see FIG. 3). In some embodiments, the ETL system 202 can instantiate different types of storage interfaces that are configured to communicatively connect to respective different types of cloud-based or on-premise data repositories or systems and send the transformed data 704 to the designated destinations via those interfaces.

Figure 8:
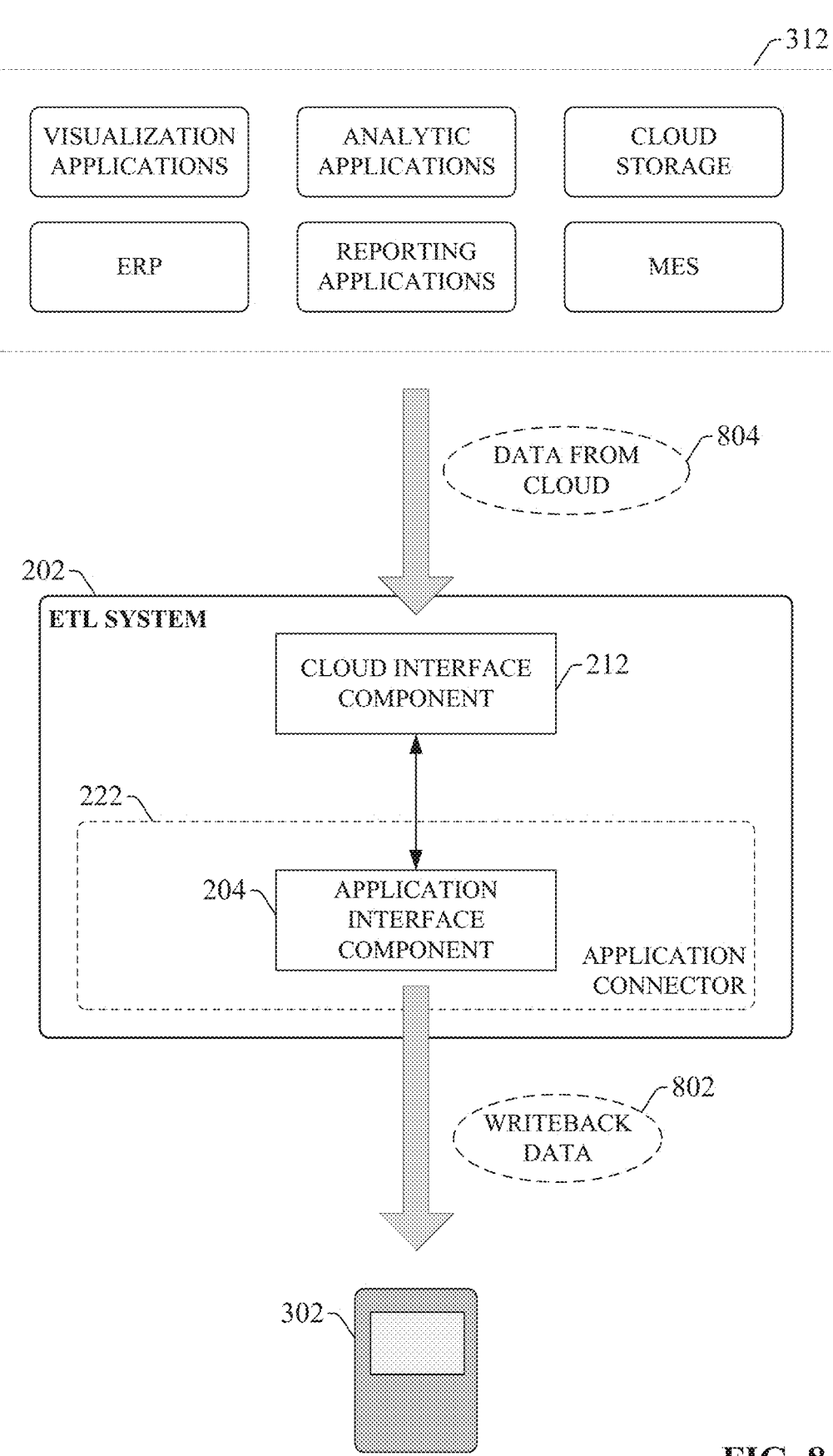
FIG. 8 is a diagram illustrating writeback of data from a cloud-based or on-premise destination application to an industrial data source via an industrial ETL system.

In addition to extraction, transformation, and migration of data from industrial data sources 302 to cloud-based or on-premise destination applications 312, the ETL system 202 can also support writeback from the destination applications 312 to the data sources 302. FIG. 8 is a diagram illustrating writeback of data from a cloud-based or on-premise destination application 312 to the industrial data source 302. In this example, data 804 directed to the industrial data source 302 or application is generated by the destination application 312 and sent to the ETL system 202 (e.g., via the communication channel established by the cloud interface component 212). The nature of the data 804 can depend on the type of the application 312. For example, in the case of a supervisory control application that makes high-level decisions about control-level operations based on analysis of the transformed data 704, the data 804 may be a control instruction directed to an industrial controller or other industrial control device that alters the control functionality being performed by the controller (e.g., an instruction that modifies a control set point used to regulate an industrial process, switches the current operating mode of an automation system being monitored and controlled by the controller, etc.). Other types of writeback data 804 directed to an industrial data source 802 are also within the scope of one or more embodiments.

The cloud interface component 212 receives the data 804 from the destination application 312, identifies an intended target data source 302 to which the data 804 is directed (e.g., based on a device or application identifier included in the data 804 received from the application 312), and sends the data to the target data source 302 via that source's application connector 222. In some embodiments, the ETL system 202 can process both data migration from the data sources 302 and writeback to the data sources 302 using parallel processing.

Figure 9:
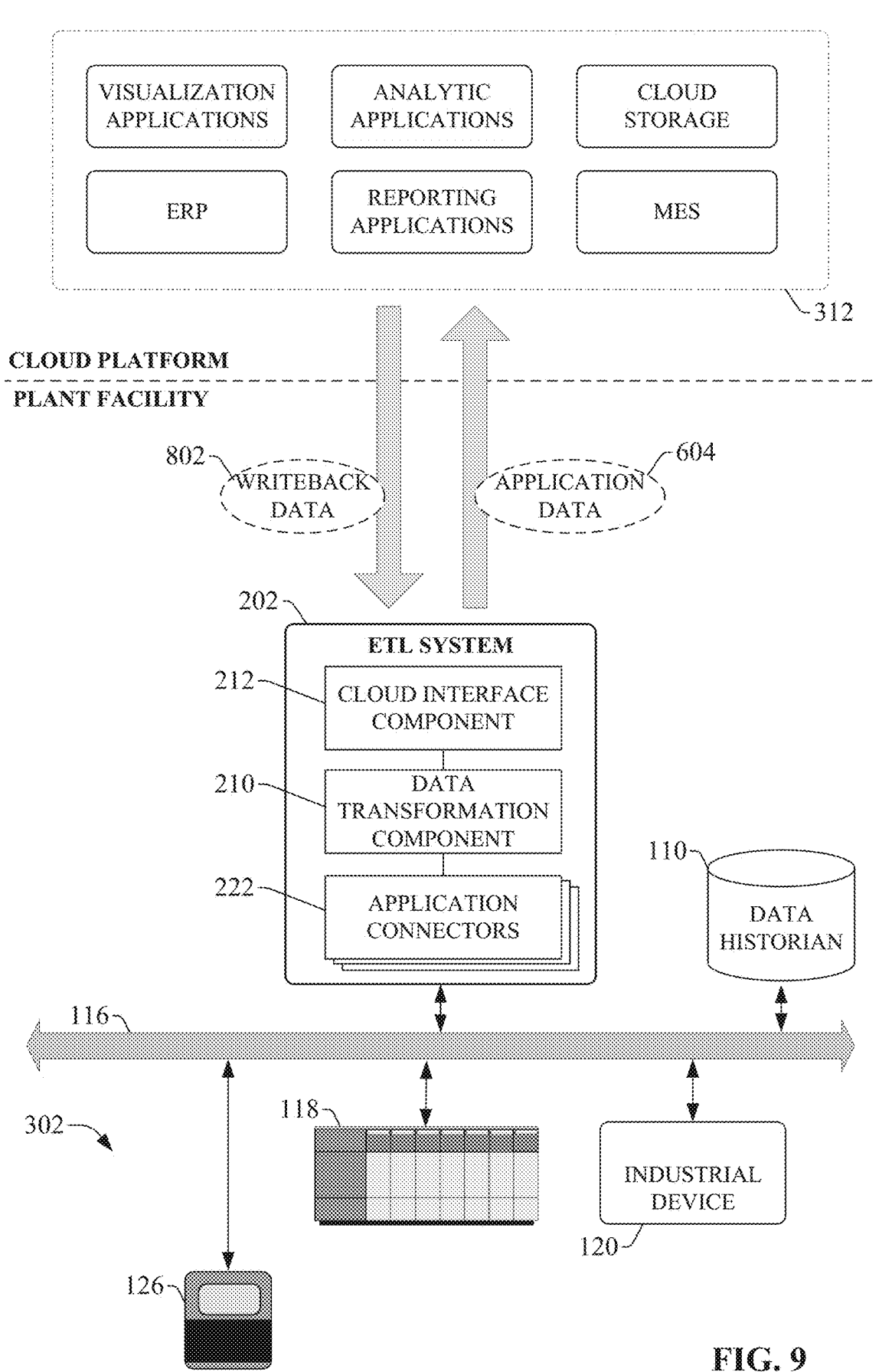
FIG. 9 is a diagram illustrating an example on-premise implementation of an industrial ETL system.

The ETL system 202 can be deployed as either an on-premise or cloud-based solution. FIG. 9 is a diagram illustrating an example on-premise implementation of the ETL system 202. In this example, the ETL system 202 resides within the plant facility in which the industrial data sources 302 operate and obtains data from those sources 302 via any intermediate local networks (e.g., plant network 116 in the illustrated example). In the case of cloud-based target applications 312, the ETL system 202 interfaces with the cloud platform from the industrial facility to migrate the collected application data 604 to those applications 312. Alternatively, the ETL system 202 may interface with destination applications 312 that execute on non-cloud-based servers that reside within or external to the industrial facility. In such scenarios, the cloud interface component 212 can exchange data with these applications 312 via any intervening public or private networks, including the plant network 116, office network 108, or the internet. For on-premise implementations such as that depicted in FIG. 9, the ETL system 202 can support store-and-forward capabilities such that, in the event of a loss of connectivity between the ETL system 202 and the destination application 312, application data 604 obtained from the data sources 302 will be stored on the ETL system's local memory until the connection to the destination application 312 is restored. When the connection to the destination application is restored, the transformed data 704 (that is, the application data 604 as transformed by the data transformation component 210) that had accumulated at the ETL system 202 during the communication loss will be sent to the destination application 312. This ensures that important application data 604 generated by the data source 302 is not lost during the communication outage.

Figure 10:
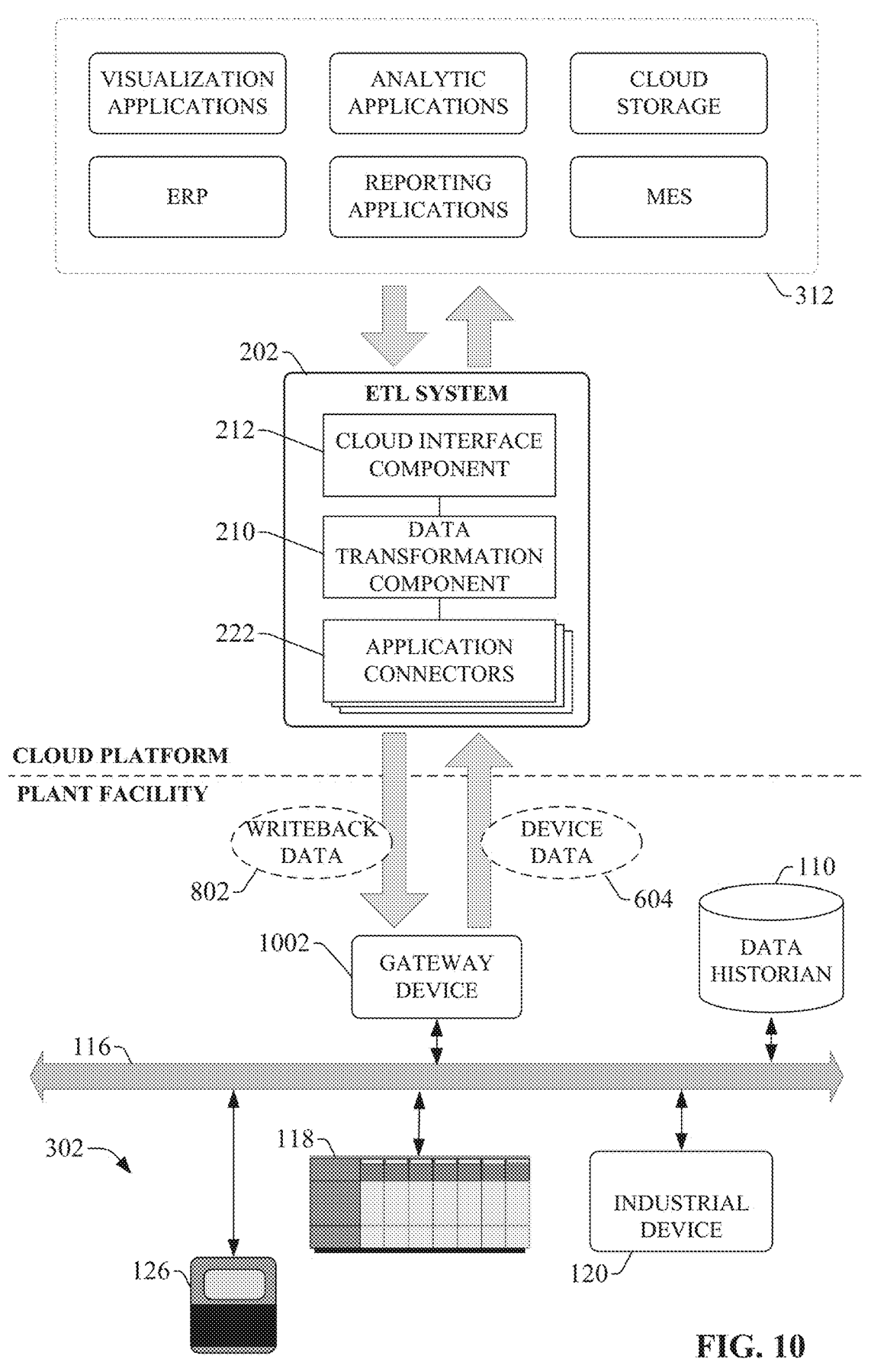
FIG. 10 is a diagram illustrating an example cloud-based implementation of an industrial ETL system.

FIG. 10 is a diagram illustrating an example cloud-based implementation of the ETL system 202. In this example, ETL system 202 executes as a set of cloud-based services on the same cloud platform on which the destination application 312 executes (or on a cloud platform from which the application 312 is otherwise accessible). From the cloud platform, the ETL system's application connectors 222 can remotely interface with the industrial data sources 302 that operate within the plant facility over any intervening public or private networks, including a secure internet connection and any local networks within the facility. In the illustrated example, the ETL system 202 accesses the data sources 302 via a gateway device 1002 installed within the facility, which serves as a communication gateway between the plant network 116 on which the data sources 302 reside and the cloud platform. However, other communication paths between the cloud-based ETL system 202 and the plant-level data sources 302 are also within the scope of one or more embodiments.

The industrial ETL system 202 described herein can more efficiently obtain and transfer data from proprietary industrial systems, applications, and devices using data connectors designed to support the communication protocols and data schemas used by those industrial data sources, while minimizing the impact on the primary functions of those industrial systems. The ETL system 202 provides data capture and writeback orchestration by leveraging a combination of native ETL capabilities for real-time event streaming to and from a selected data repository or high-level application. The ETL system 202 can provide a cloud-agnostic and scalable platform for bi-directional acquisition and movement of data across an industrial enterprise, including across network boundaries in edge-to-cloud scenarios.

Figure 11:
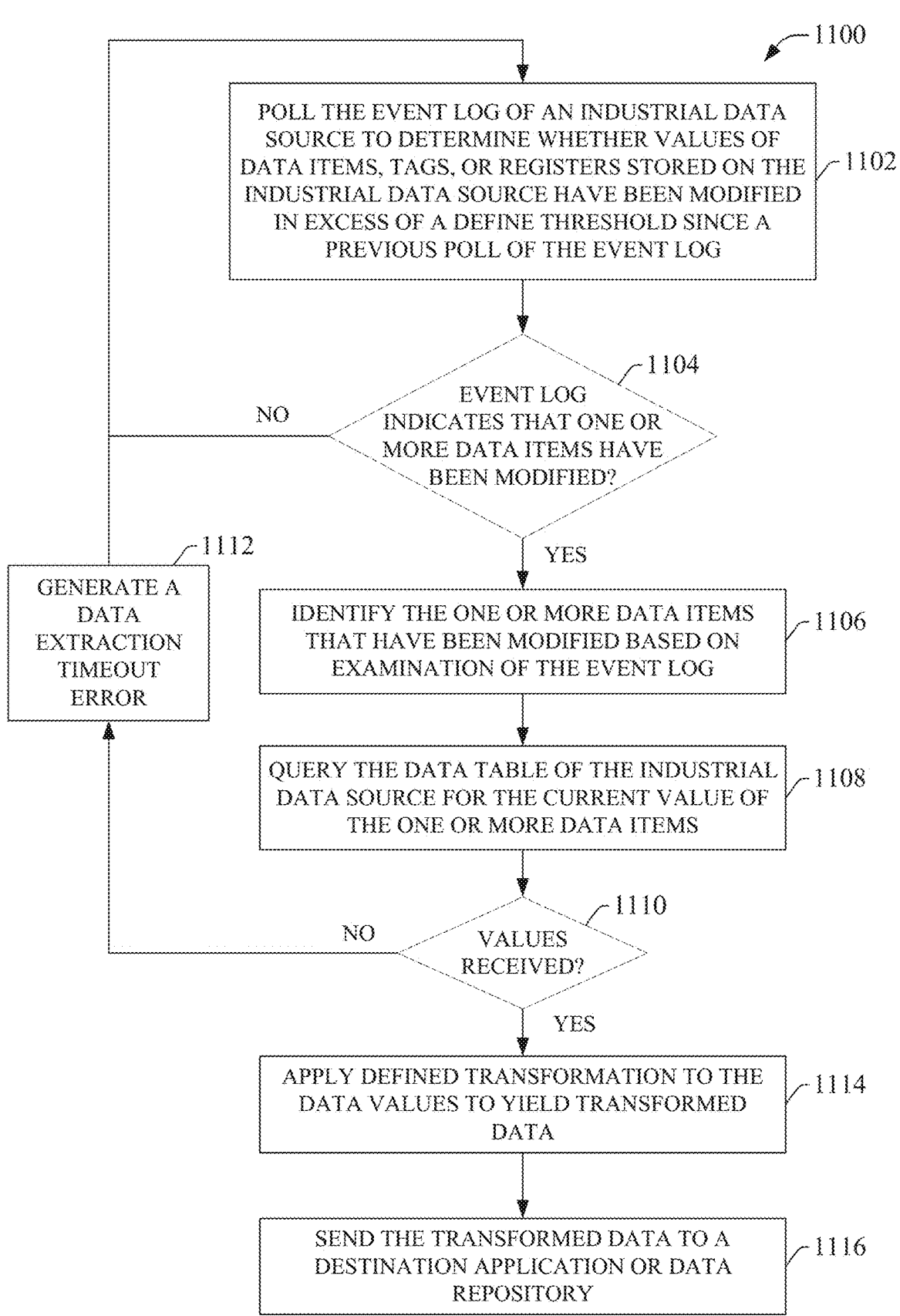
FIG. 11 is a flowchart of an example methodology for extracting data from industrial devices or applications operating within an industrial environment and sending the data to a destination system or application executing on a cloud platform or on a server.

FIG. 11 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11 illustrates a methodology 1100 for extracting data from industrial devices or applications operating within an industrial environment and sending the data to a destination system or application executing on a cloud platform or on a server (a server located either within the plant facility or outside the plant facility). Initially, at 1102, the event log generated by an industrial data source—such as an industrial device, system, or application—is polled by an ETL system to determine whether values of data items, tags, or registers stored on the industrial data source have been modified in excess of a defined threshold since a previous poll of the event log. The ETL system can execute on a local server or other type of computing platform residing within the industrial facility, or alternatively may execute as a set of cloud-based services on a cloud platform. The industrial data source can be, for example, an industrial device (e.g., an industrial controller, and HMI terminal, a motor drive, a telemetry device or sensor, etc.); a software application that leverages data generated by an industrial automation system to perform related storage, processing, or communication functions (e.g., data historians, OPC servers, databases, MQTT brokers, batch control systems, industrial alarm systems, communication applications that maintain communication links between industrial software and devices, edge devices, etc.); or another type of industrial data source. The event log can be a file generated by the industrial data source that records software or hardware events initiated or detected by the software application that executes on the industrial data source.

At 1104, a determination is made, based on the polling performed at step 1102, as to whether the event log indicates that one or more of the data items maintained on the industrial data source have been modified since the most recent previous poll of the event log (or have been modified in excess of a defined threshold relative to most recently collected values of the data items). To determine whether any of the data items have been modified, the polling can examine event log entries that were added to the event log since the previous poll, and determine whether any of the log entries indicate that a data item has been modified. The modification may be, for example, a result of a write event performed by software executing on the data source, a user-entered value change, or a change to a data value initiated by a separate system or application. If no data items have been changed since the previous poll of the event log, the methodology returns to step 1102. Alternatively, if the event log indicates that one or more data items have been modified since the previous poll of the event log (YES at step 1104), the methodology proceeds to step 1106, where the one or more data items that have been modified since the previous poll are identified based on an examination of the event log.

At 1108, the data source's data table, or the memory location in which the data source's data items or tags are stored, is queried for the current values of the one or more data items identified at step 1106. At 1110, a determination is made as to whether the values requested at step 1108 are received within a defined timeout period. If the requested values are not received within the timeout period (NO at step 1110), the methodology proceeds to step 1112, where a data extraction timeout error is generated, then returns to step 1102. Alternatively, if the data values are received (YES at step 1110), the methodology proceeds to step 1114, where a defined transformation is applied to the received data values to yield transformed data. Example transformations can include removal of outlier data, addition of contextual metadata, performing pre-analytics on the data and bundling the results with the data, or other such data transformations.

At 1116, the transformed data generated at step 1114 is sent to a destination application or data repository. Example destinations for the transformed data can include, for example, visualization applications, analytic applications (e.g., predictive maintenance applications, optimization applications, energy management applications, etc.), MES systems, ERP systems, data repositories such as data lakes, reporting applications, or other such destinations.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
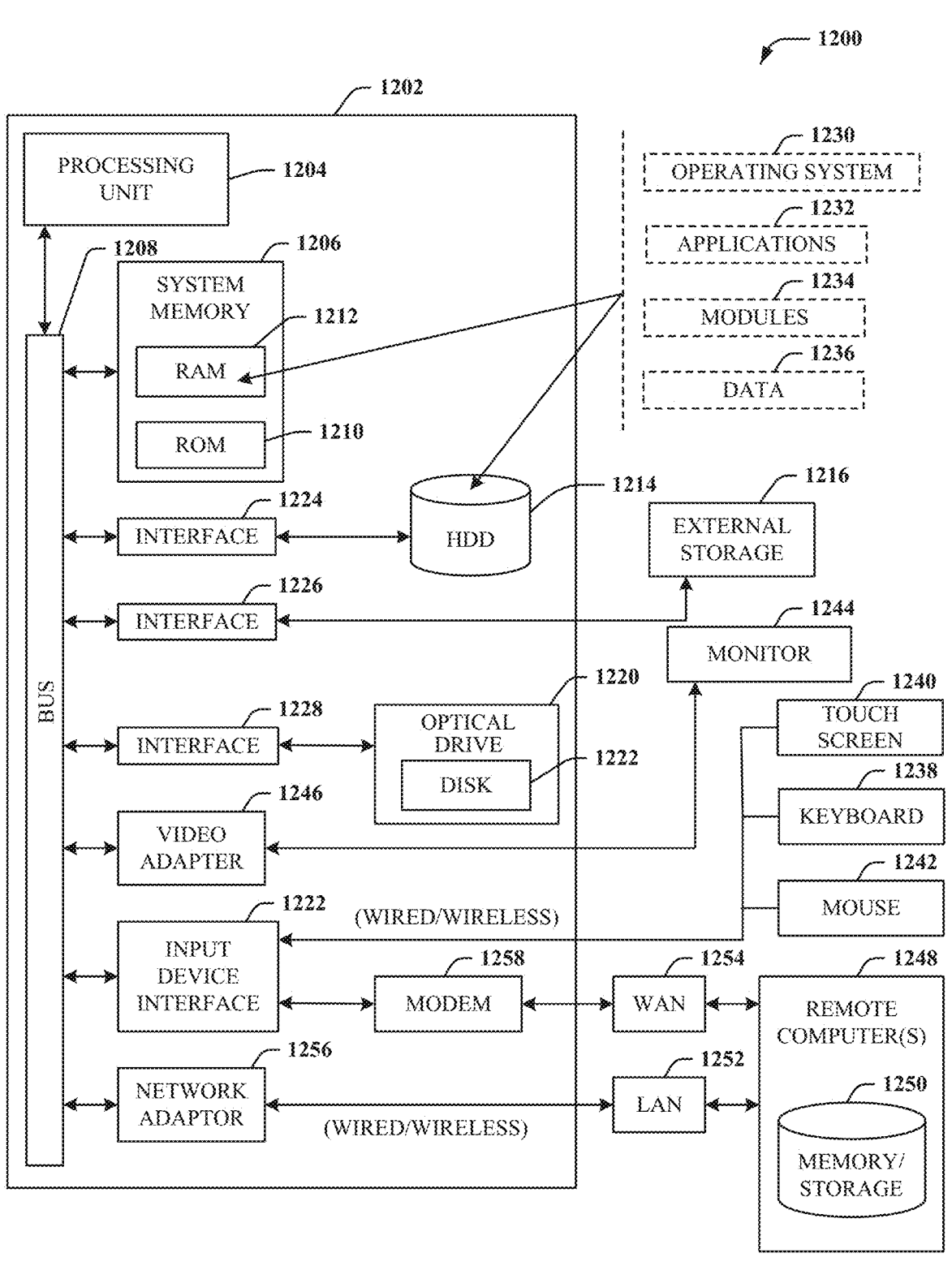
FIG. 12 is an example computing environment.
Figure 13:
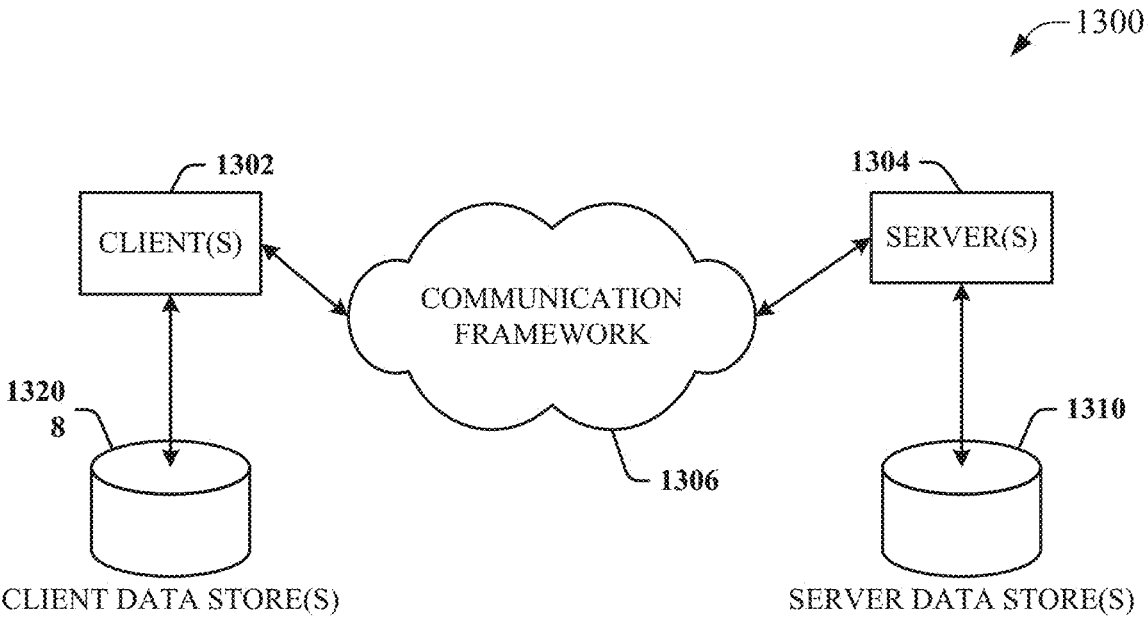
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 11. In such an embodiment, operating system 1230 can comprise one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the adapter 1256 in a wireless mode.

When used in a WAN networking environment, the computer 1202 can include a modem 1258 or can be connected to a communications server on the WAN 1254 via other means for establishing communications over the WAN 1254, such as by way of the Internet. The modem 1258, which can be internal or external and a wired or wireless device, can be connected to the system bus 1208 via the input device interface 1222. In a networked environment, program modules depicted relative to the computer 1202 or portions thereof, can be stored in the remote memory/storage device 1250. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1252 or WAN 1254 e.g., by the adapter 1256 or modem 1258, respectively. Upon connecting the computer 1202 to an associated cloud storage system, the external storage interface 1226 can, with the aid of the adapter 1256 and/or modem 1258, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server (s) 1304 are operably connected to one or more server data store(s) 1010 that can be employed to store information local to the servers 1004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
an application interface component configured to establish a communication channel to an industrial data source, wherein the industrial data source maintains a data table that stores current values of data items that are written to and read from by the industrial data source;
a log query component configured to identify, based on an examination of an event log generated by and stored on the industrial data source, a subset of the data items whose values have been modified in excess of a defined threshold since a previous examination of the event log, wherein the event log comprises a chronological sequence of time-stamped event records that record software or hardware events initiated by or detected by the industrial data source and is stored separately from the data table; and
a data retrieval component configured to query, via the communication channel, the data table for values of the subset of the data items based on a result of the examination.

2. The system of claim 1, further comprising a cloud interface component configured to send the values of the subset of the data items to a destination application residing on a cloud platform or an external server.

3. The system of claim 2, further comprising a data transformation component configured to apply transformation processing on the values of the subset of the data items to yield transformed data,
wherein the cloud interface component is configured to send the transformed data to the destination application.

4. The system of claim 3, wherein the transformation processing comprises at least one of filtering the values, adding contextual metadata to the values, or applying analytics to the values.

5. The system of claim 2, wherein the destination application is at least one of a visualization application, an analytic application, a data repository, a reporting application, a manufacturing execution system, an enterprise resource planning system, or a supervisory control application.

6. The system of claim 2, wherein
the cloud interface component is further configured to receive data from the destination application directed to the industrial data source, and
the application interface is configured to write the data to the industrial data source.

7. The system of claim 1, wherein the data source is one of an industrial controller, a motor drive, a telemetry device, a sensor, a data historian, an open platform communications (OPC) server, an MQ telemetry transport (MQTT) broker, an industrial analytic application, or a gateway device.

8. The system of claim 1, wherein the system executes on a cloud platform.

9. The system of claim 1, wherein the time-stamped event records record, as the software or hardware events, at least one of operating system events, data write events performed by the industrial data source, data read events performed by the industrial data source, queries received and processed by the industrial data source, execution errors, or user data entries.

10. The system of claim 1, wherein the log query component is configured to identify the subset of the data items based on a determination that a subset of the time-stamped event records that were added to the event log since the previous examination of the event log indicate that the values of the subset of the data items were modified in excess of the defined threshold.

11. A method, comprising:
establishing, by a system comprising a processor, a connection to an industrial data source, wherein the industrial data source stores current values of respective data tags that are written to and read from by the industrial data source in a data table;
identifying, by the system based on an examination of an event log generated by and stored on the industrial data source, a subset of the data tags having values that have changed in excess of a defined threshold since a previous examination of the event log, wherein the event log comprises a chronological sequence of time-stamped event records that record software or hardware events initiated by or detected by the industrial data source and is stored separately from the data table; and
in response to the identifying, querying, by the system via the connection, the data table for values of the subset of the data tags.

12. The method of claim 11, further comprising sending, by the system, the values of the subset of the data tags to a destination application executing on a cloud platform or a server.

13. The method of claim 12, further comprising applying transformation processing on the values of the subset of the data tags to yield transformed data,
wherein the sending comprises sending the transformed data to the destination application.

14. The method of claim 13, wherein the applying comprises at least one of filtering the values, adding contextual metadata to the values, or applying analytics to the values.

15. The method of claim 12, wherein the destination application is at least one of a visualization application, an analytic application, a data repository, a reporting application, a manufacturing execution system, an enterprise resource planning system, or a supervisory control application.

16. The method of claim 12, further comprising:
receiving, by the system, data from the destination application directed to the industrial data source, and
writing, by the system, the data to the industrial data source via the connection.

17. The method of claim 11, wherein the data source is one of an industrial controller, a motor drive, a telemetry device, a sensor, a data historian, an open platform communications (OPC) server, an MQ telemetry transport (MQTT) broker, an industrial analytic application, or a gateway device.

18. A non-transitory computer-readable medium having stored thereon instructions that, in response to execution, cause a system comprising a processor to perform operations, the operations comprising:

establishing a communication channel to an industrial
data source, wherein the industrial data source main-
tains a data table that stores current values of data
registers that are written to and read from by the
industrial data source;

examining, via the communication channel, an event log
generated by and stored on the industrial data source,
wherein the event log comprises a chronological
sequence of time-stamped event records that record
software or hardware events initiated by or detected by
the industrial data source and is stored separately from
the data table;

identifying, based the examining, a subset of the data
registers whose values have changed in excess of a
threshold since a previous examining of the event log;
and in response to the identifying, querying, via the commu-
nication channel, the data table for values of the subset
of the data registers.

19. The non-transitory computer-readable medium of
claim 18, further comprising:

receiving the values of the subset of the data registers in
response to the querying; and sending the values of the subset of the data registers to a
destination application executing on a cloud platform
or a server.

20. The non-transitory computer-readable medium of
claim 18, wherein the data source is one of an industrial
controller, a motor drive, a telemetry device, a sensor, a data
historian, an open platform communications (OPC) server,
an MQ telemetry transport (MQTT) broker, an industrial
analytic application, or a gateway device.

\* \* \* \* \*